United States Patent
Park et al.

(10) Patent No.: US 9,472,346 B2
(45) Date of Patent: *Oct. 18, 2016

(54) MULTILAYER CERAMIC CAPACITOR AND BOARD HAVING THE SAME MOUNTED THEREON

(71) Applicant: SAMSUNG ELECTRO-MECHANICS CO., LTD., Suwon-Si, Gyeonggi-Do (KR)

(72) Inventors: Min Cheol Park, Suwon-Si (KR); Sang Soo Park, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 214 days.

This patent is subject to a terminal disclaimer.

(21) Appl. No.: 14/257,852

(22) Filed: Apr. 21, 2014

(65) Prior Publication Data

US 2015/0131196 A1 May 14, 2015

(30) Foreign Application Priority Data

Nov. 8, 2013 (KR) .................. 10-2013-0135274

(51) Int. Cl.
| | |
|---|---|
| *H01G 4/30* | (2006.01) |
| *H01G 4/40* | (2006.01) |
| *H01G 2/06* | (2006.01) |
| *H01G 4/012* | (2006.01) |
| *H01G 4/232* | (2006.01) |
| *H01G 4/12* | (2006.01) |

(52) U.S. Cl.
CPC ............... *H01G 4/40* (2013.01); *H01G 2/065* (2013.01); *H01G 4/012* (2013.01); *H01G 4/232* (2013.01); *H01G 4/30* (2013.01); *H01G 4/12* (2013.01)

(58) Field of Classification Search
None
See application file for complete search history.

(56) References Cited

U.S. PATENT DOCUMENTS

| | | | |
|---|---|---|---|
| 2009/0086403 | A1 | 4/2009 | Lee et al. |
| 2010/0002356 | A1* | 1/2010 | Yoshida ................. H01G 4/30 361/301.4 |
| 2012/0075766 | A1* | 3/2012 | Nishioka ............... H01G 4/30 361/301.4 |
| 2012/0134068 | A1* | 5/2012 | Chae ..................... H01G 4/012 361/321.2 |
| 2015/0114700 | A1* | 4/2015 | Park ...................... H01G 4/012 174/260 |
| 2015/0116892 | A1* | 4/2015 | Park ...................... H01G 4/40 361/275.3 |
| 2015/0131195 | A1* | 5/2015 | Park ...................... H01G 2/14 361/275.3 |
| 2015/0325378 | A1* | 11/2015 | Park ...................... H01G 4/40 333/185 |

FOREIGN PATENT DOCUMENTS

| | | |
|---|---|---|
| JP | 2011-181976 A | 9/2011 |
| JP | 2012-256641 A | 12/2012 |

* cited by examiner

*Primary Examiner* — Dion R Ferguson
(74) *Attorney, Agent, or Firm* — McDermott Will & Emery LLP

(57) ABSTRACT

A multilayer ceramic capacitor may include: a ceramic body including dielectric layers, first and second main surfaces opposing each other, first and second side surfaces opposing each other, and first and second end surfaces opposing each other; a capacitor part including first internal electrodes and second internal electrodes; a resistor part including first internal connection conductors and second internal connection conductors; first dummy electrodes and second dummy electrodes; first to fourth external electrodes electrically connected to the first and second internal electrodes and the first and second internal connection conductors; and a first connection terminal and a second connection terminal. The capacitor part and the resistor part are connected in series to each other.

24 Claims, 10 Drawing Sheets

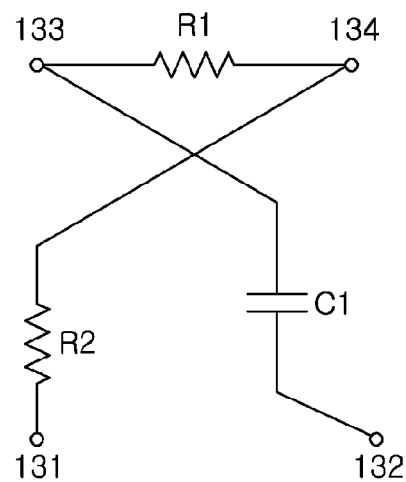
FIG. 4
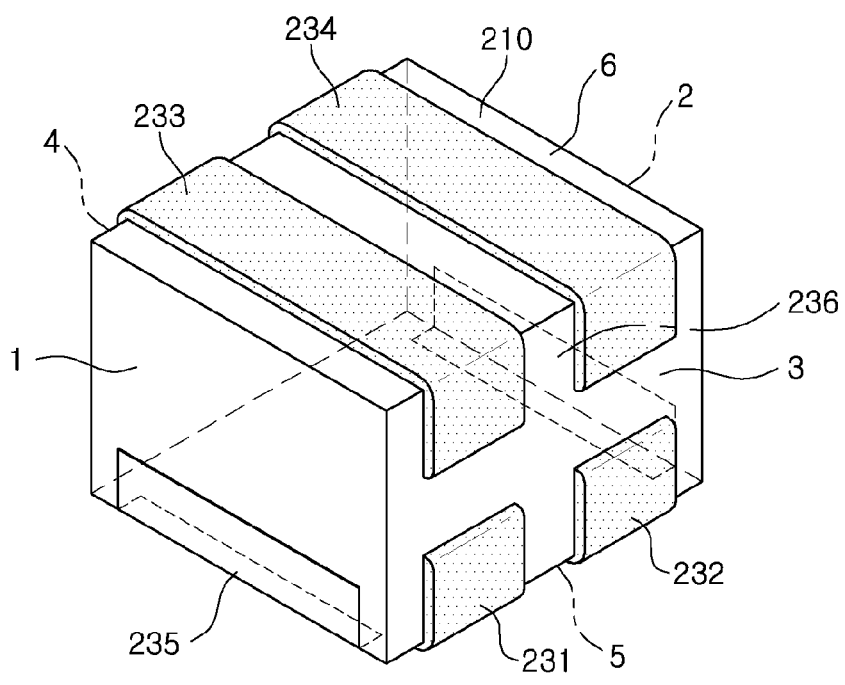
FIG. 5
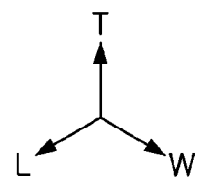

MULTILAYER CERAMIC CAPACITOR AND BOARD HAVING THE SAME MOUNTED THEREON

CROSS-REFERENCE TO RELATED APPLICATION

This application claims the benefit of Korean Patent Application No. 10-2013-0135274 filed on Nov. 8, 2013, with the Korean Intellectual Property Office, the disclosure of which is incorporated herein by reference.

BACKGROUND

The present disclosure relates to a multilayer ceramic capacitor and a board having the same mounted thereon.

A multilayer ceramic capacitor, a multilayer chip electronic component, is a chip-type condenser commonly mounted on the circuit boards of various electronic products including display devices such as liquid crystal displays (LCDs), plasma display panels (PDPs), and the like, computers, smartphones, cellular phones, and the like, to charge and discharge electrical charges.

Multilayer ceramic capacitors may be used as components in various electronic devices, due to inherent advantages thereof, such as compactness, high degrees of capacitance, and ease of mountability.

A general multilayer ceramic capacitor may have a structure including a plurality of dielectric layers and internal electrodes, the internal electrodes having different polarities being alternately stacked with at least one dielectric layer interposed therebetween.

A power supply device for a central processing unit (CPU) of a computer, or the like, may have a problem in which voltage noise is generated due to rapid changes in a load current in the process of providing low voltage.

In this regard, multilayer capacitors have widely been used in power supply devices as decoupling capacitors for suppressing such voltage noise.

A multilayer ceramic capacitor for decoupling is required to have low equivalent series inductance (ESL) as an operation frequency is increased. Thus, research into reducing ESL levels in multilayer ceramic capacitors has been actively conducted.

Further, in order to supply power in a stable manner, a multilayer ceramic capacitor used for decoupling needs to control a level of equivalent series resistance (ESR).

In the case in which ESR of the multilayer ceramic capacitor is lower than a required level, an impedance peak at a parallel resonance frequency generated due to the ESL of the capacitor and plane capacitance of a micro processor package may increase, and impedance at a series resonance frequency of the capacitor may be excessively reduced.

Therefore, in order to allow a user to obtain flat impedance characteristics in a power distribution network, the ESR of the multilayer ceramic capacitor for decoupling should be easily controllable.

With regard to controlling ESR, the use of a material having a high degree of electrical resistance for external and internal electrodes may be considered. In this regard, changing the material of external and internal electrodes may provide high ESR while maintaining the related art low ESL structure.

However, in the case of using such a material having a high degree of electrical resistance for the external electrodes, a localized hot spot, caused by a current crowding phenomenon resulting from pin holes, may be generated.

Further, in the case of using such a material having a high degree of electrical resistance for the internal electrodes, the material of the internal electrodes may be necessarily changed so that it can be matched with a ceramic material of the dielectric layers.

Therefore, since existing measures for controlling ESR have disadvantages as described above, research into a multilayer ceramic capacitor allowing for the controlling of ESR remains necessary.

In addition, in accordance with the recent trend for the rapid development of mobile terminals, such as tablet personal computers (PCs), Ultrabooks, and the like, microprocessors have also become miniaturized and highly integrated.

Therefore, areas of printed circuit boards have decreased, and mounting spaces for decoupling capacitors have been similarly limited, and thus, a multilayer ceramic capacitor capable of addressing the issue of limited mounting space remains in demand.

SUMMARY

An aspect of the present disclosure may provide a multilayer ceramic capacitor and a board having the same mounted thereon.

According to an aspect of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part disposed in the ceramic body and including first internal electrodes each having a first lead exposed to the second main surface and second internal electrodes each having a second lead exposed to the first main surface; a resistor part disposed in the ceramic body and including first internal connection conductors having third and fourth leads exposed to the second main surface and second internal connection conductors having fifth and sixth leads exposed to the first and second main surfaces; first dummy electrodes disposed in the ceramic body and exposed to the first main surface and the first end surface of the ceramic body and second dummy electrodes disposed in the ceramic body and exposed to the first main surface and the second end surface of the ceramic body; first to fourth external electrodes disposed on the first and second main surfaces of the ceramic body and electrically connected to the first and second internal electrodes and the first and second internal connection conductors; and a first connection terminal disposed on the first main surface and the first end surface of the ceramic body and connected to the first dummy electrodes and a second connection terminal disposed on the first main surface and the second end surface of the ceramic body and connected to the second dummy electrodes, wherein the capacitor part and the resistor part may be connected in series to each other.

The first lead of the first internal electrode may be connected to the third external electrode, and the second lead of the second internal electrode may be connected to the second external electrode.

The first internal connection conductor may be connected to the first internal electrode via the third external electrode and connected to the second internal connection conductor via the fourth external electrode.

One end of the second internal connection conductor may be connected to the first internal connection conductor via the fourth external electrode, and the other end thereof may be connected to the first external electrode.

According to another aspect of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part disposed in the ceramic body and including first internal electrodes each having a seventh lead exposed to the second main surface and second internal electrodes each having an eighth lead exposed to the first main surface; a resistor part disposed in the ceramic body and including first internal connection conductors each having ninth and tenth leads exposed to the second main surface and second internal connection conductors exposed to the first and second main surfaces; first dummy electrodes disposed in the ceramic body and exposed to the first main surface and the first end surface of the ceramic body and second dummy electrodes disposed in the ceramic body and exposed to the first main surface and the second end surface of the ceramic body; first to fourth external electrodes disposed on the first and second main surfaces of the ceramic body and electrically connected to the first and second internal electrodes and the first and second internal connection conductors; and a first connection terminal disposed on the first main surface and the first end surface of the ceramic body and connected to the first dummy electrodes and a second connection terminal disposed on the first main surface and the second end surface of the ceramic body and connected to the second dummy electrodes, wherein the capacitor part and the resistor part may be connected in series to each other.

The seventh lead of the first internal electrode may be connected to the fourth external electrode, and the eighth lead of the second internal electrode may be connected to the second external electrode.

The first internal connection conductor may be connected to the first internal electrode via the fourth external electrode and connected to the second internal connection conductor via the third external electrode.

One end of the second internal connection conductor may be connected to the first internal connection conductor via the third external electrode, and the other end thereof may be connected to the first external electrode.

According to another aspect of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part disposed in the ceramic body and including first internal electrodes each having an eleventh lead exposed to the second main surface and second internal electrodes each having a twelfth lead exposed to the first main surface; a resistor part disposed in the ceramic body and including first internal connection conductors each having thirteenth and fourteenth leads exposed to the second main surface, third internal connection conductors exposed to the first and second main surfaces, second internal connection conductors each having fifteenth and sixteenth leads exposed on the second main surface, and fourth internal connection conductors exposed to the first and second main surfaces, the first and third internal connection conductors being disposed on an dielectric layer and the second and fourth internal connection conductors being disposed on another dielectric layer; first dummy electrodes disposed in the ceramic body and exposed to the first main surface and the first end surface of the ceramic body and second dummy electrodes disposed in the ceramic body and exposed to the first main surface and the second end surface of the ceramic body; first to fourth external electrodes disposed on the first and second main surfaces of the ceramic body and electrically connected to the first and second internal electrodes and the first to fourth internal connection conductors; and a first connection terminal disposed on the first main surface and the first end surface of the ceramic body and connected to the first dummy electrodes and a second connection terminal disposed on the first main surface and the second end surface of the ceramic body and connected to the second dummy electrodes, wherein the capacitor part and the resistor part may be connected in series to each other.

The eleventh lead of the first internal electrode may be connected to the fourth external electrode, and the twelfth lead of the second internal electrode may be connected to the second external electrode.

The first internal connection conductor may be connected to the first internal electrode via the fourth external electrode, connected to the third internal connection conductor via the third external electrode, and connected to the second and fourth internal connection conductors via the fourth external electrode.

The second internal connection conductor may be connected to the first internal connection conductor via the third external electrode and connected to the fourth internal connection conductor via the fourth external electrode.

One end of the fourth internal connection conductor may be connected to the second internal connection conductor via the fourth external electrode, and the other end thereof may be connected to the first external electrode.

According to another aspect of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part disposed in the ceramic body and including first internal electrodes each having a seventeenth lead exposed to the first main surface and second internal electrodes each having an eighteenth lead exposed to the second main surface; a first resistor part disposed in the ceramic body and including first internal connection conductors each having nineteenth and twentieth leads exposed to the second main surface and a second resistor part disposed in the ceramic body and including second internal connection conductors each having a twenty-first lead exposed to the first main surface and twenty-second and twenty-third leads exposed to the second main surface; first dummy electrodes disposed in the ceramic body and exposed to the first main surface and first end surface of the ceramic body and second dummy electrodes disposed in the ceramic body and exposed to the first main surface and the second end surface of the ceramic body; first to fourth external electrodes disposed on the first and second main surfaces of the ceramic body and electrically connected to the first and second internal electrodes and the first and second internal connection conductors; and a first connection terminal disposed on the first main surface and the first end surface of the ceramic body and connected to the first dummy electrodes and a second connection terminal disposed on the first main surface and the second end surface of the ceramic body and connected to the second dummy electrodes, wherein the capacitor part and the first and second resistor parts may be connected in series to each other, and the first and second resistor parts may be connected in parallel to each other.

The seventeenth lead of the first internal electrode may be connected to the first external electrode, and the eighteenth lead of the second internal electrode may be connected to the third external electrode.

The first internal connection conductor may be connected to the second internal electrode via the third external electrode and connected to the second internal connection conductor via the third and fourth external electrodes.

The twenty-second and twenty-third leads of the second internal connection conductor may be connected to the first internal connection conductor via the third and fourth external electrodes, and the twenty-first lead thereof may be connected to the second external electrode.

According to another aspect of the present disclosure, a board having a multilayer ceramic capacitor mounted thereon may include: a printed circuit board having first to fourth electrode pads disposed thereon; and the multilayer ceramic capacitor as described above mounted on the printed circuit board.

The third electrode pad may contact the first connection terminal.

The fourth electrode pad may contact the second connection terminal.

The first and third electrode pads may contact each other, and the second and fourth electrode pads may contact each other.

BRIEF DESCRIPTION OF DRAWINGS

The above and other aspects, features and other advantages of the present disclosure will be more clearly understood from the following detailed description taken in conjunction with the accompanying drawings, in which:

FIG. 4 is an equivalent circuit diagram of the multilayer ceramic capacitor of FIG. 1;

FIG. 5 is a perspective view of a multilayer ceramic capacitor according to a second exemplary embodiment of the present disclosure;

DETAILED DESCRIPTION

Figure 1:
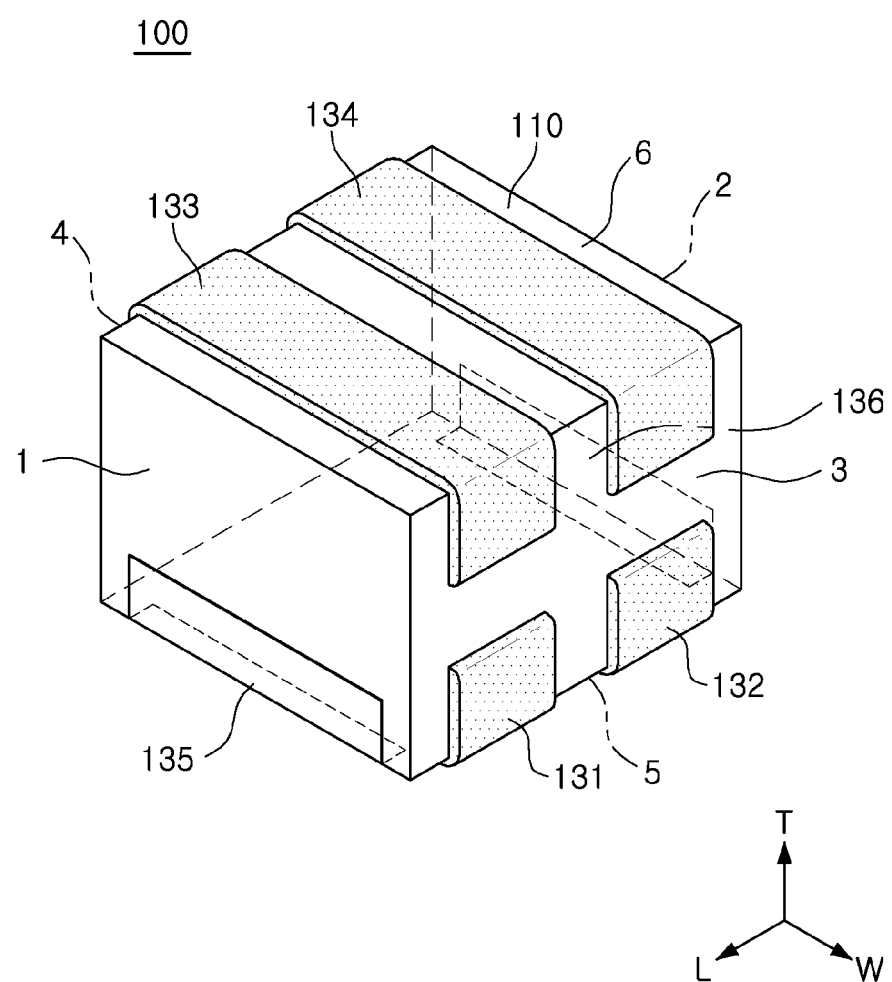
FIG. 1 is a perspective view of a multilayer ceramic capacitor according to a first exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedron will be defined in order to clearly describe exemplary embodiments of the present disclosure. L, W and T shown in the accompanying drawings refer to a length direction, a width direction, and a thickness direction, respectively. Here, the thickness direction may be the same as a direction in which dielectric layers are stacked.

Multilayer Ceramic Capacitor

FIG. 1 is a perspective view of a multilayer ceramic capacitor according to a first exemplary embodiment of the present disclosure.

Figure 2:
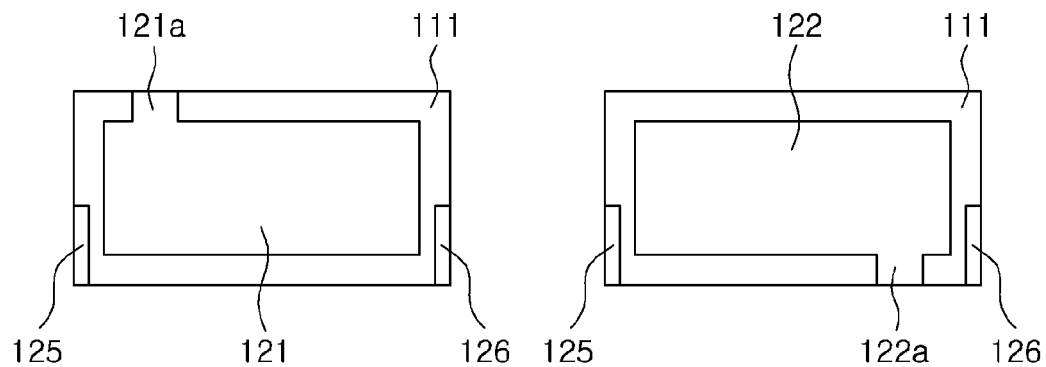
FIG. 2 is a plan view of first and second internal electrodes applicable to the multilayer ceramic capacitor of FIG. 1.

FIG. 2 is a plan view of first and second internal electrodes applicable to the multilayer ceramic capacitor of FIG. 1.

Figure 3:
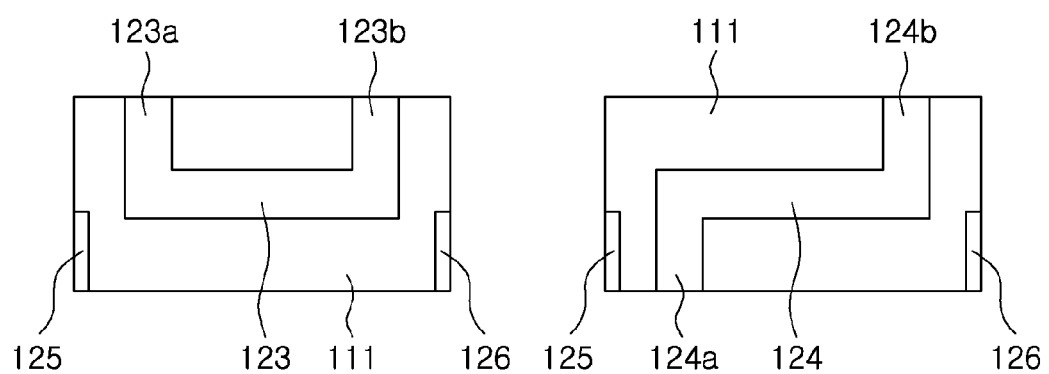
FIG. 3 is a plan view of first and second internal connection conductors usable with the first and second internal electrodes of FIG. 2.

FIG. 3 is a plan view of first and second internal connection conductors usable with the first and second internal electrodes of FIG. 2.

Referring to FIGS. 1 through 3, a multilayer ceramic capacitor 100 according to the first exemplary embodiment of the present disclosure may include a ceramic body 110 including a plurality of dielectric layers 111 and having first and second main surfaces opposing each other, first and second side surfaces opposing each other, and first and second end surfaces opposing each other.

In this exemplary embodiment, the ceramic body 110 may have first and second main surfaces 5 and 6 opposing each other, and first and second side surfaces 3 and 4 and first and second end surfaces 1 and 2 that connect the first and second main surfaces to each other.

A shape of the ceramic body 110 is not particularly limited, but may be hexahedral as shown.

The ceramic body 110 may be formed by stacking the plurality of dielectric layers, and a plurality of first and second internal electrodes 121 and 122 may be disposed in the ceramic body 110 to be separated from each other with each of the dielectric layers interposed therebetween.

The plurality of dielectric layers 111 configuring the ceramic body 110 may be in a sintered state. Adjacent dielectric layers may be integrated so that boundaries therebetween are not readily apparent.

The dielectric layer 111 may be formed by sintering a ceramic green sheet containing ceramic powder, an organic solvent, and an organic binder. The ceramic powder may have high permittivity, and a barium titanate ($BaTiO_3$) based material, a strontium titanate ($SrTiO_3$) based material, or the like, may be used therefor. However, the ceramic powder is not limited thereto.

The multilayer ceramic capacitor 100 may include a capacitor part formed in the ceramic body 110 and including the first internal electrodes 121 each having a first lead 121*a* exposed to the second side surface 6 and the second internal electrodes 122 each having a second lead 122*a* exposed to the first side surface 5.

According to the first exemplary embodiment of the present disclosure, the first and second internal electrodes 121 and 122 may be formed of a conductive paste containing a conductive metal.

The conductive metal may be nickel (Ni), copper (Cu), palladium (Pd), or an alloy thereof, but is not limited thereto.

The internal electrodes may be printed on ceramic green sheets forming the dielectric layers using the conductive paste by a printing method such as a screen printing method or a gravure printing method.

The ceramic green sheets having the internal electrodes printed thereon may be alternately stacked and sintered, thereby forming the ceramic body.

In addition, the multilayer ceramic capacitor 100 may include a resistor part formed in the ceramic body 110 and including a first resistor part R1 formed of the first internal connection conductors 123 each having third and fourth leads 123*a* and 123*b* exposed to the second main surface 6 and a second resistor part R2 formed of the second internal connection conductors 124 each having fifth and sixth leads 124*a* and 124*b* exposed to the first and second main surfaces 5 and 6.

That is, the first and second internal connection conductors 123 and 124 of the resistor part may function as equivalent series resistors (ESR) within the multilayer ceramic capacitor.

The first and second internal connection conductors 123 and 124 are not particularly limited, but may be formed of, for example, a conductive paste containing a conductive metal, similarly to the first and second internal electrodes 121 and 122.

The conductive metal may be nickel (Ni), copper (Cu), palladium (Pd), or an alloy thereof, but is not limited thereto.

In addition, the multilayer ceramic capacitor 100 may include first dummy electrodes 125 formed in the ceramic body 110 and exposed to the first main surface 5 and the first end surface 1 of the ceramic body 110 and second dummy electrodes 126 formed in the ceramic body 110 and exposed to the first main surface 5 and the second end surface 2 of the ceramic body 110.

The first and second dummy electrodes 125 and 126 are not particularly limited, but may be formed of, for example, a conductive paste containing a conductive metal, similarly to the first and second internal electrodes 121 and 122.

The conductive metal may be nickel (Ni), copper (Cu), palladium (Pd), or an alloy thereof, but is not limited thereto.

In addition, the multilayer ceramic capacitor 100 may include first to fourth external electrodes 131 to 134 formed on the first and second main surfaces 5 and 6 of the ceramic body 110 and electrically connected to the first and second internal electrodes 121 and 122 and the first and second internal connection conductors 123 and 124.

The first and second external electrodes 131 and 132 may be disposed to be spaced apart from each other on the first main surface 5 of the ceramic body 110, and the third and fourth external electrodes 133 and 134 may be disposed to be spaced apart from each other on the second main surface 6 of the ceramic body.

According to the first exemplary embodiment of the present disclosure, a mounting surface of the multilayer ceramic capacitor 100 may be the first or second main surface 5 or 6 of the ceramic body 110.

That is, the multilayer ceramic capacitor according to the first exemplary embodiment of the present disclosure may be vertically mounted, but is not limited thereto. The multilayer ceramic capacitor may be mounted in various manners.

Therefore, the first and second external electrodes 131 and 132 may contact first and second electrode pads of a board when the multilayer ceramic capacitor is mounted on the board.

According to the first exemplary embodiment of the present disclosure, it may be understood that the first and second external electrodes 131 and 132 are used as external terminals for connection with a power line, and the remaining third and fourth external electrodes 133 and 134 are used for controlling equivalent series resistance (ESR).

However, since the first and second external electrodes used as the external terminals may be optionally selected according to desired ESR characteristics, the first and second external electrodes are not particularly limited.

The third and fourth external electrodes 133 and 134 capable of being used for controlling ESR may be non-contact terminals that are not connected to the power line and may be positioned on an upper surface of the multilayer ceramic capacitor when mounted.

That is, according to the first exemplary embodiment of the present disclosure, since the third and fourth external electrodes 133 and 134, the non-contact terminals, are formed on the upper surface of the multilayer ceramic capacitor rather than the side surface thereof, downsizing may not be hindered by the non-contact terminals. Therefore, such a structure may be advantageous for miniaturizing a product.

The first to fourth external electrodes 131 to 134 may be formed of a conductive paste containing a conductive metal.

The conductive metal may be nickel (Ni), copper (Cu), tin (Sn), or an alloy thereof, but is not limited thereto.

The conductive paste may further contain an insulating material. The insulating material may be, for example, glass, but is not limited thereto.

A method of forming the first to fourth external electrodes 131 to 134 is not particularly limited. That is, the first to fourth external electrodes 131 to 134 may be formed on the ceramic body by a printing method, a dipping method, a plating method, or the like.

A plating layer may be further formed on the first to fourth external electrodes 131 to 134.

The multilayer ceramic capacitor 100 is a four-terminal capacitor having a total of four external electrodes, but the present disclosure is not limited thereto.

In addition, the multilayer ceramic capacitor 100 may include a first connection terminal 135 formed on the first main surface 5 and the first end surface 1 of the ceramic body 110 and connected to the first dummy electrodes 125 and a second connection terminal 136 formed on the first main surface 5 and the second end surface 2 of the ceramic body 110 and connected to the second dummy electrodes 126.

The first and second connection terminals 135 and 136 are formed on the first main surface and both end surfaces of the ceramic body, such that directionality of the multilayer ceramic capacitor may be determined when the multilayer ceramic capacitor is mounted on a board to be described below.

The first and second connection terminals 135 and 136 may be formed of a conductive metal.

The conductive metal may be nickel (Ni), copper (Cu), tin (Sn), or an alloy thereof, but is not limited thereto.

That is, the first and second connection terminals 135 and 136 may be formed by plating, unlike the first to fourth external electrodes 131 to 134. Therefore, the first and second connection terminals 135 and 136 may not contain glass, unlike the first to fourth external electrodes 131 to 134.

Meanwhile, the first and second connection terminals 135 and 136 formed as plating layers may be connected to the first and second external electrodes 131 and 132, respectively, but are not limited thereto.

Hereinafter, in the configuration of the multilayer ceramic capacitor 100 according to the first exemplary embodiment of the present disclosure, the first and second internal electrodes 121 and 122, the first and second internal connection conductors 123 and 124, and the first to fourth external electrodes 131 to 134 will be described in detail with reference to FIGS. 1 through 3.

The capacitor part may be formed in the ceramic body 110 and include the first internal electrodes 121 each having the first lead 121a exposed to the second main surface 6 and the second internal electrodes 122 each having the second lead 122a exposed to the first main surface 5 to thereby form capacitance.

The first leads 121a of the first internal electrodes 121 may be connected to the third external electrode 133, and the second leads 122a of the second internal electrodes 122 may be connected to the second external electrode 132, but the present disclosure is not limited thereto.

The capacitor part may be disposed within the ceramic body 110 without particular limitations, and in order to generate a target capacitance, the plurality of internal electrodes of the capacitor part may be stacked.

The first internal connection conductors 123 may be connected to the first internal electrodes 121 via the third external electrode 133 and connected to the second internal connection conductors 124 via the fourth external electrode 134.

The first internal connection conductors 123 may be connected to the third external electrode 133 via the third leads 123a exposed to the second main surface 6 and be connected to the first internal electrodes 121 connected to the third external electrode 133.

Further, the first internal connection conductors 123 may be connected to the fourth external electrode 134 via the fourth leads 123b exposed to the second main surface 6 and be connected to the second internal connection conductors 124 exposed to the first and second main surfaces 5 and 6.

In the first exemplary embodiment of the present disclosure, one ends of the second internal connection conductors 124 exposed to the second main surface 6 may be connected to the first internal connection conductors 123 via the fourth external electrode 134 and the other ends thereof exposed to the first main surface 5 may be connected to the first external electrode 131.

The second internal connection conductors 124 may be connected to the first external electrode 131 via the fifth leads 124a and connected to the fourth external electrode 134 via the sixth leads 124b.

The first and second internal electrodes 121 and 122, together with the first and second internal connection conductors 123 and 124, may be alternately disposed with each of the dielectric layers 111 interposed therebetween.

Meanwhile, the internal electrodes and the internal connection conductors may be stacked in a sequence as illustrated in FIGS. 2 and 3, but is not limited thereto and may be stacked in various sequences, as necessary.

The desired equivalent series resistance (ESR) characteristics may be more precisely controlled by changing widths and lengths of the first and second internal connection conductors 123 and 124, and the number of stacked internal connection conductors.

Pattern shapes of the first and second internal connection conductors 123 and 124 illustrated in FIG. 3 are exemplary, and the first and second internal connection conductors 123 and 124 may have various pattern shapes in order to control ESR.

For example, the first and second internal connection conductors 123 and 124 may have the same pattern shapes as those of the first and second internal electrodes 121 and 122 as illustrated in FIG. 2.

According to the first exemplary embodiment of the present disclosure, the first and second internal connection conductors 123 and 124 may form the resistor part, respectively, and the ESR of the multilayer ceramic capacitor may be controlled by the resistor part.

That is, to be described below, the capacitor part including the first and second internal electrodes 121 and 122 and the resistor part including the first and second internal connection conductors 123 and 124 may be connected in series to each other.

Through the foregoing connection, the ESR) of the multilayer ceramic capacitor may be controlled.

Further, in this exemplary embodiment, the first and second external electrodes 131 and 132 may be used for connection with a power line, and the second external electrode 132 may be connected to a ground.

Meanwhile, the third and fourth external electrodes 133 and 134 may be used to control the ESR and may be understood as non-contact terminals.

FIG. 4 is an equivalent circuit diagram of the multilayer ceramic capacitor of FIG. 1.

Referring to FIG. 4, the capacitor part C1 including the first and second internal electrodes 121 and 122 and the resistor parts R1 and R2 including the first and second internal connection conductors 123 and 124 may be connected in series to each other.

As described above, the multilayer ceramic capacitor according to the first exemplary embodiment of the present disclosure may have two kinds of resistors and one kind of capacitor and control respective values thereof.

The multilayer ceramic capacitor according to the first exemplary embodiment of the present disclosure has a structure including the internal electrodes 121 and 122, the internal connection conductors 123 and 124, and the external electrodes 131 to 134 as described above, such that it may be easy to reduce and control impedance in a wider frequency range, and a mounting space and a cost may be reduced due to a decrease in the number of components, as compared to an existing structure.

In addition, as the multilayer ceramic capacitor is vertically mounted, downsizing may not be hindered by the non-contact terminals. Therefore, such a structure may be advantageous for miniaturizing the product.

FIG. 5 is a perspective view of a multilayer ceramic capacitor according to a second exemplary embodiment of the present disclosure.

Figure 6:
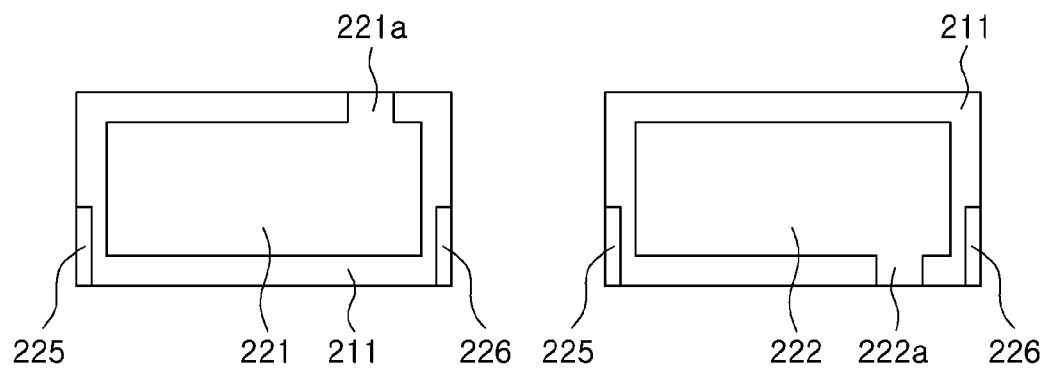
FIG. 6 is a plan view of first and second internal electrodes applicable to the multilayer ceramic capacitor of FIG. 5.

FIG. 6 is a plan view of first and second internal electrodes applicable to the multilayer ceramic capacitor of FIG. 5.

Figure 7:
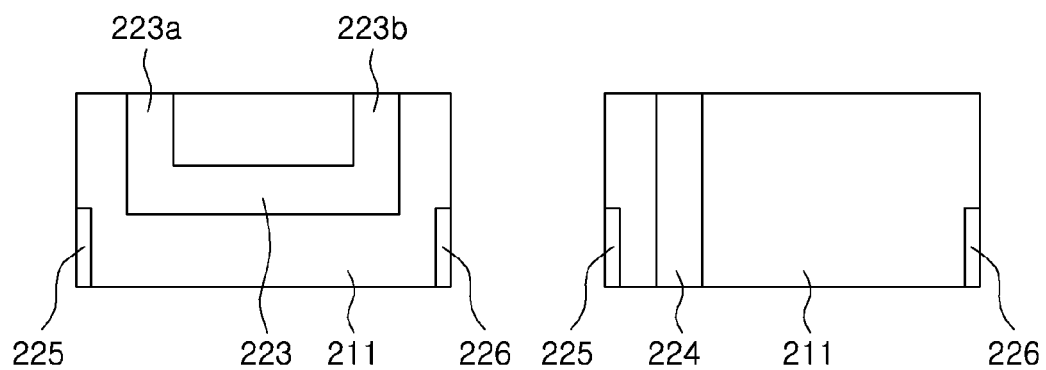
FIG. 7 is a plan view of first and second internal connection conductors usable with the first and second internal electrodes of FIG. 6.

FIG. 7 is a plan view of first and second internal connection conductors usable with the first and second internal electrodes of FIG. 6.

Figure 8:
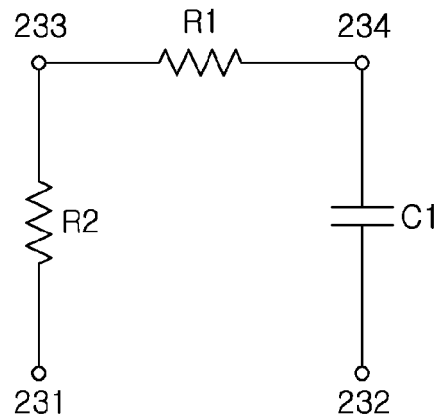
FIG. 8 is an equivalent circuit diagram of the multilayer ceramic capacitor of FIG. 5.

FIG. 8 is an equivalent circuit diagram of the multilayer ceramic capacitor of FIG. 5.

Referring to FIGS. 5 through 8, a multilayer ceramic capacitor 200 according to the second exemplary embodiment of the present disclosure may include: a ceramic body 210 including a plurality of dielectric layers 211 and having first and second main surfaces opposing each other, first and second side surfaces opposing each other, and first and second end surfaces opposing each other; a capacitor part formed in the ceramic body 210 and including first internal electrodes 221 each having a seventh lead 221a exposed to the second main surface and second internal electrodes 222 each having an eighth lead 222a exposed to the first main surface; a resistor part formed in the ceramic body 210 and including first internal connection conductors 223 each having ninth and tenth leads 223a and 223b exposed to the second main surface and second internal connection conductors 224 exposed to the first and second main surfaces; first dummy electrodes 225 formed in the ceramic body 210 and exposed to the first main surface and the first end surface of the ceramic body 210 and second dummy electrodes 226 formed in the ceramic body 210 and exposed to the first main surface and the second end surface of the ceramic body 210; first to fourth external electrodes 231 to 234 formed on the first and second main surfaces of the ceramic body 210 and electrically connected to the first and second internal electrodes 221 and 222 and the first and second internal connection conductors 223 and 224; and a first connection terminal 235 formed on the first main surface and the first end surface of the ceramic body 210 and connected to the first dummy electrodes 225 and a second connection terminal 236 formed on the first main surface and the second end surface of the ceramic body 210 and connected to the second dummy electrodes 226, wherein the capacitor part and the resistor part may be connected in series to each other.

In the second exemplary embodiment of the present disclosure, the seventh leads 221a of the first internal electrodes 221 may be connected to the fourth external electrode 234, and the eighth leads 222a of the second internal electrodes 222 may be connected to the second external electrode 232.

In the second exemplary embodiment of the present disclosure, the first internal connection conductors 223 may be connected to the first internal electrodes 221 via the fourth external electrode 234 and connected to the second internal connection conductors 224 via the third external electrode 233.

In addition, one ends of the second internal connection conductors 224 may be connected to the first internal connection conductors 223 via the third external electrode 233, and the other ends thereof may be connected to the first external electrode 231.

Referring to FIG. 8, the capacitor part C1 including the first and second internal electrodes 221 and 222 and the resistor parts R1 and R2 including the first and second internal connection conductors 223 and 224 may be connected in series to each other.

Since other features of the multilayer ceramic capacitor according to the second exemplary embodiment of the present disclosure are the same as those of the multilayer ceramic capacitor according to the first exemplary embodiment of the present disclosure, a detailed description thereof will be omitted.

Figure 9:
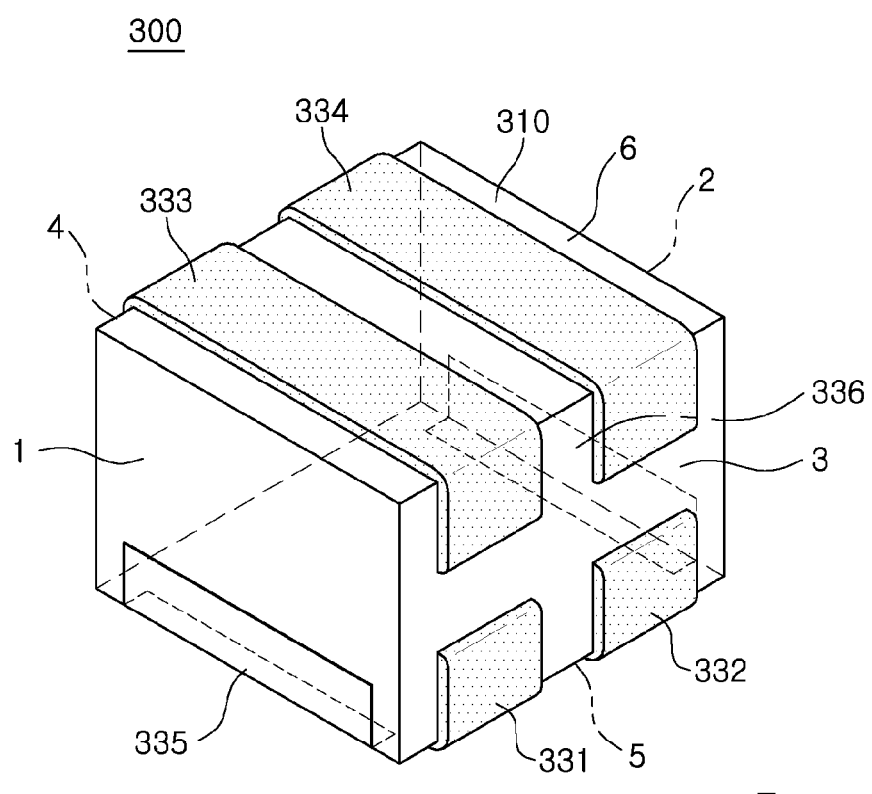
FIG. 9 is a perspective view of a multilayer ceramic capacitor according to a third exemplary embodiment of the present disclosure.
Figure 9:
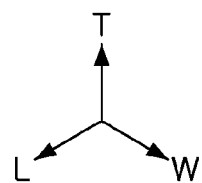

FIG. 9 is a perspective view of a multilayer ceramic capacitor according to a third exemplary embodiment of the present disclosure.

Figure 10:
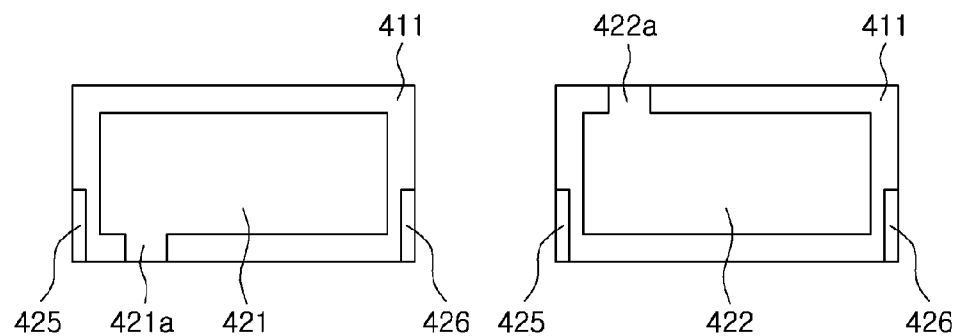
FIG. 10 is a plan view of first and second internal electrodes applicable to the multilayer ceramic capacitor of FIG. 9.

FIG. 10 is a plan view of first and second internal electrodes applicable to the multilayer ceramic capacitor of FIG. 9.

Figure 11:
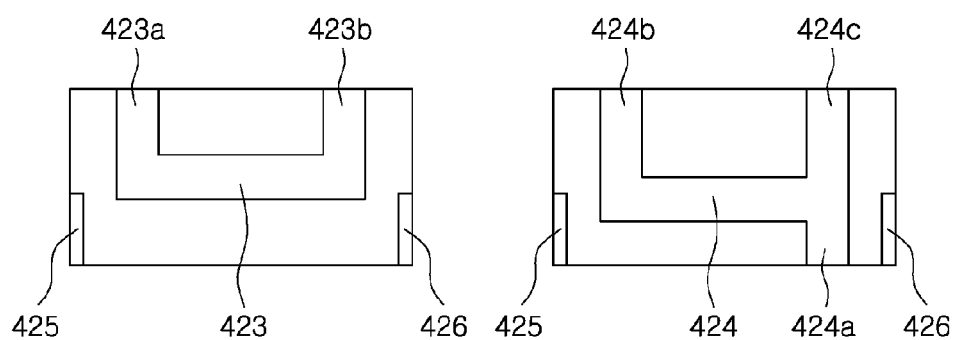
FIG. 11 is a plan view of first and second internal connection conductors usable with the first and second internal electrodes of FIG. 10.

FIG. 11 is a plan view of first to fourth internal connection conductors usable with the first and second internal electrodes of FIG. 10.

Referring to FIGS. 9 through 11, a multilayer ceramic capacitor 300 according to the third exemplary embodiment of the present disclosure may include: a ceramic body 310 including a plurality of dielectric layers 311 and having first and second main surfaces opposing each other, first and second side surfaces opposing each other, and first and second end surfaces opposing each other; a capacitor part formed in the ceramic body 310 and including first internal electrodes 321 each having an eleventh lead 321a exposed to the second main surface and second internal electrodes 322 each having a twelfth lead 322a exposed to the first main surface; a resistor part formed in the ceramic body 310 and including first internal connection conductors 323 each having thirteenth and fourteenth leads 323a and 323b exposed to the second main surface, third internal connection conductors 323' exposed to the first and second main surfaces, second internal connection conductors 324 each having fifteenth and sixteenth leads 324a and 324b exposed to the second main surface, and fourth internal connection conductors 324' exposed to the first and second main surfaces, the first and third internal connection conductors 323 and 323' being formed on one dielectric layer 311 and the second and fourth internal connection conductors 324 and 324' being formed on another dielectric layer 311; first dummy electrodes 325 formed in the ceramic body 310 and exposed to the first main surface and the first end surface of the ceramic body 310 and second dummy electrodes 326 formed in the ceramic body 310 and exposed to the first main surface and the second end surface of the ceramic body 310; first to fourth external electrodes 331 to 334 formed on the first and second main surfaces of the ceramic body 310 and electrically connected to the first and second internal electrodes 321 and 322 and the first to fourth internal connection conductors 323, 324, 323', and 324'; and a first connection terminal 335 formed on the first main surface and the first end surface of the ceramic body 310 and connected to the first dummy electrodes 325 and a second connection terminal 336 formed on the first main surface and the second end surface of the ceramic body 310 and connected to the second dummy electrodes 326, wherein the capacitor part and the resistor part may be connected in series to each other.

In the third exemplary embodiment of the present disclosure, the eleventh leads 321a of the first internal electrodes 321 may be connected to the fourth external electrode 334, and the twelfth leads 322a of the second internal electrodes 322 may be connected to the second external electrode 332.

In the third exemplary embodiment of the present disclosure, the first internal connection conductors 323 may be connected to the first internal electrodes 321 via the fourth external electrode 334, connected to the third internal connection conductors 323' via the third external electrode 333, and connected to the second and fourth internal connection conductors 324 and 324' via the fourth external electrode 334.

In the third exemplary embodiment of the present disclosure, the second internal connection conductors 324 may be connected to the first internal connection conductors 323 via the third external electrode 333 and connected to the fourth internal connection conductors 324' via the fourth external electrode 334.

In the third exemplary embodiment of the present disclosure, one ends of the fourth internal connection conductors 324' may be connected to the second internal connection conductor 324 via the fourth external electrode 334, and the other ends thereof may be connected to the first external electrode 331.

Referring to FIGS. 10 and 11, the capacitor part including the first and second internal electrodes 321 and 322 and the resistor part including the first to fourth internal connection conductors 323, 324, 323', and 324' may be connected in series to each other.

Since other features of the multilayer ceramic capacitor according to the third exemplary embodiment of the present disclosure are the same as those of the multilayer ceramic capacitor according to the first exemplary embodiment of the present disclosure, a detailed description thereof will be omitted.

Figure 12:
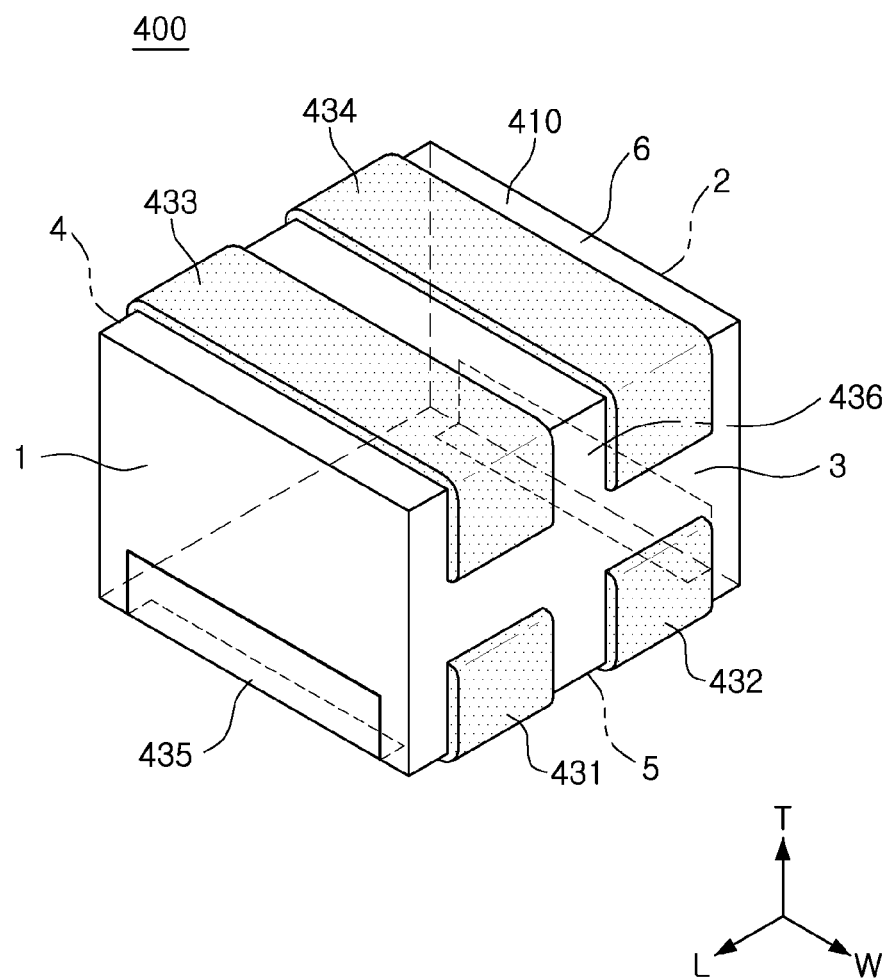
FIG. 12 is a perspective view of a multilayer ceramic capacitor according to a fourth exemplary embodiment of the present disclosure.

FIG. 12 is a perspective view of a multilayer ceramic capacitor according to a fourth exemplary embodiment of the present disclosure.

Figure 13:
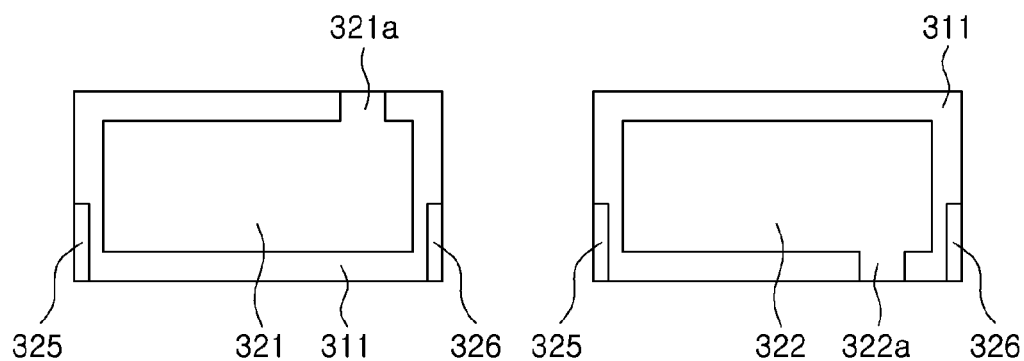
FIG. 13 is a plan view of first and second internal electrodes applicable to the multilayer ceramic capacitor of FIG. 12.

FIG. 13 is a plan view of first and second internal electrodes applicable to the multilayer ceramic capacitor of FIG. 12.

Figure 14:
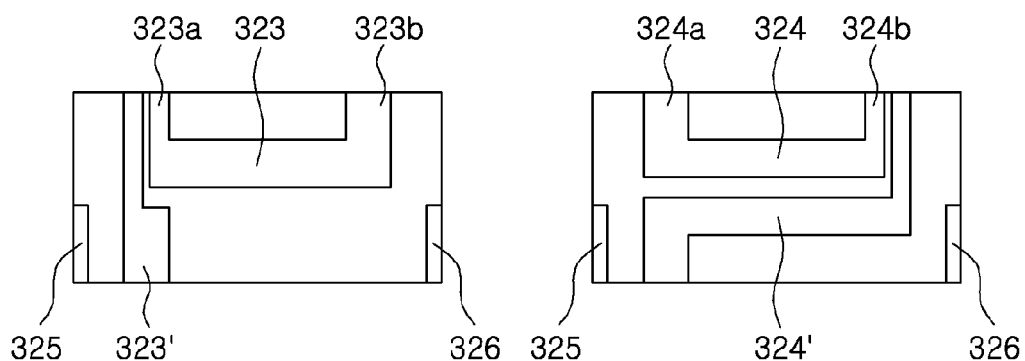
FIG. 14 is a plan view of first and second internal connection conductors usable with the first and second internal electrodes of FIG. 13.

FIG. 14 is a plan view of first and second internal connection conductors usable with the first and second internal electrodes of FIG. 13.

Figure 15:
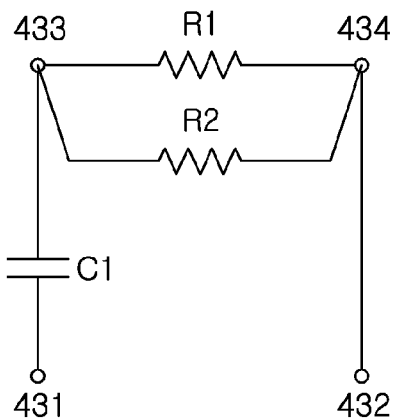
FIG. 15 is an equivalent circuit diagram of the multilayer ceramic capacitor of FIG. 12.

FIG. 15 is an equivalent circuit diagram of the multilayer ceramic capacitor of FIG. 12.

Referring to FIGS. 12 through 15, a multilayer ceramic capacitor 400 according to the fourth exemplary embodiment of the present disclosure may include: a ceramic body 410 including a plurality of dielectric layers 411 and having first and second main surfaces opposing each other, first and second side surfaces opposing each other, and first and second end surfaces opposing each other; a capacitor part C1 formed in the ceramic body 410 and including first internal electrodes 421 each having a seventeenth lead 421a exposed to the first main surface and second internal electrodes 422 each having an eighteenth lead 422a exposed to the second main surface; a first resistor part R1 formed in the ceramic body 410 and including first internal connection conductors 423 each having nineteenth and twentieth leads 423a and 423b exposed to the second main surface and a second resistor part R2 formed in the ceramic body 410 and including second internal connection conductors 424 each having a twenty-first lead 424a exposed to the first main surface and twenty-second and twenty-third leads 424b and 424c exposed to the second main surface; first dummy electrodes 425 formed in the ceramic body 410 and exposed to the first main surface and first end surface of the ceramic body 410 and second dummy electrodes 426 formed in the ceramic body 410 and exposed to the first main surface and the second end surface of the ceramic body 410; and first to fourth external electrodes 431 to 434 formed on the first and second main surfaces of the ceramic body 410 and electrically connected to the first and second internal electrodes 421 and 422 and the first and second internal connection conductors 423 and 424; and a first connection terminal 435 formed on the first main surface and the first end surface of the ceramic body 410 and connected to the first dummy electrodes 425 and a second connection terminal 436 formed on the first main surface and the second end surface of the ceramic body 410 and connected to the second dummy electrodes 426, wherein the capacitor part C1 and the first and second resistor parts R1 and R2 are connected in series to each other, and the first and second resistor parts R1 and R2 are connected in parallel to each other.

In the fourth exemplary embodiment of the present disclosure, the seventeenth leads 421a of the first internal electrodes 421 may be connected to the first external electrode 431, and the eighteenth leads 422a of the second internal electrodes 422 may be connected to the third external electrode 433.

In the fourth exemplary embodiment of the present disclosure, the first internal connection conductors 423 may be connected to the second internal electrodes 422 via the third external electrode 433 and connected to the second internal connection conductors 422 via the third and fourth external electrodes 433 and 434.

In the fourth exemplary embodiment of the present disclosure, the twenty-second and twenty-third leads 424b and 424c of the second internal connection conductors 424 may be connected to the first internal connection conductors 423 via the third and fourth external electrodes 433 and 434, and the twenty-first leads 424a thereof may be connected to the second external electrode 432.

Referring to FIG. 15, the capacitor part C1 and the first and second resistor parts R1 and R2 may be connected in series to each other, and the first and second resistor parts R1 and R2 may be connected in parallel to each other Since other features of the multilayer ceramic capacitor according to the fourth exemplary embodiment of the present disclosure are the same as those of the multilayer ceramic capacitor according to the first exemplary embodiment of the present disclosure, a detailed description thereof will be omitted.

Board Having Multilayer Ceramic Capacitor Mounted Thereon

Figure 16:
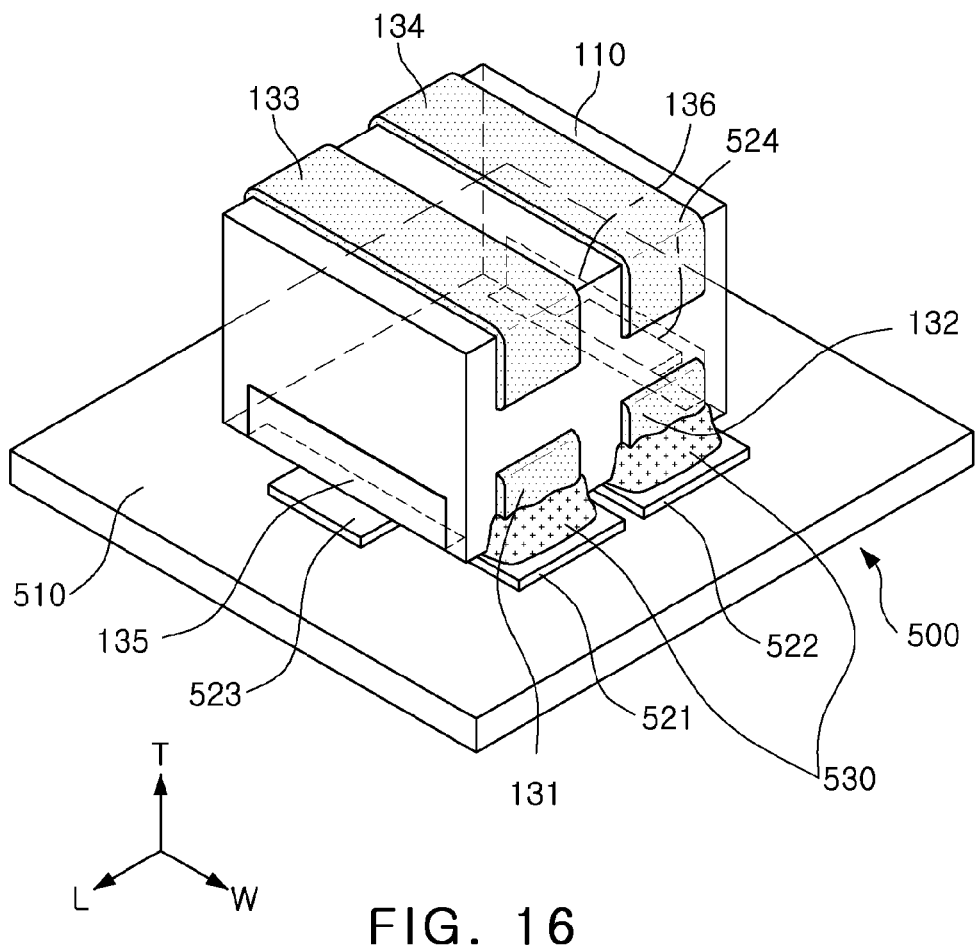
FIG. 16 is a perspective view of a structure in which the multilayer ceramic capacitor of FIG. 1 is mounted on a printed circuit board.

FIG. 16 is a perspective view of a structure in which the multilayer ceramic capacitor of FIG. 1 is mounted on a printed circuit board.

Referring to FIG. 16, a board 500 having the multilayer ceramic capacitor 100 mounted thereon according to this exemplary embodiment may include a printed circuit board 510 on which the multilayer ceramic capacitor 100 is vertically mounted, and first to fourth electrode pads 521 to 524 formed on the printed circuit board 510 to be spaced apart from each other.

In this case, the multilayer ceramic capacitor 100 may be electrically connected to the printed circuit board 510 by solders 530 in a state in which the first and second external electrodes 131 and 132 are positioned to contact the first and second electrode pads 521 and 522, respectively.

The first connection terminal 135 may be electrically connected to the printed circuit board 510 in a state in which it is positioned to contact the third electrode pad 523.

The second connection terminal 136 may be electrically connected to the printed circuit board 510 in a state in which it is positioned to contact the fourth electrode pad 524.

Meanwhile, the first and third electrode pads 521 and 523 may contact each other, and the second and fourth electrode pads 522 and 524 may contact each other, but the present disclosure is not limited thereto.

A description of features the same as those of the multilayer ceramic capacitor according to the first exemplary embodiment of the present disclosure will be omitted.

Figure 17:
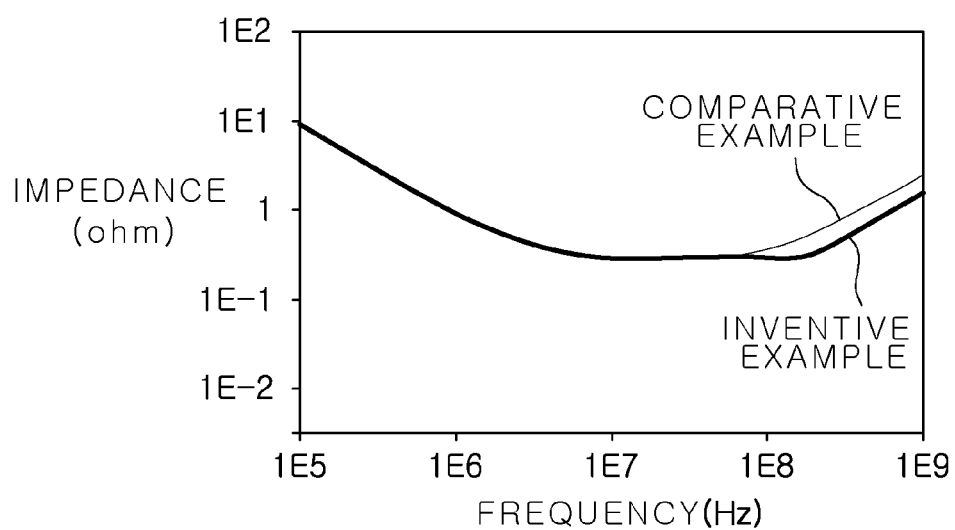
FIG. 17 is a graph illustrating comparison results of impedance levels between Inventive Example and Comparative Example.

FIG. 17 is a graph illustrating comparison results of impedance between Inventive Example and Comparative Example.

Referring to FIG. 17, it may be seen that in the multilayer ceramic capacitor according to Inventive Example, impedance may be flat in a wider frequency region and the effect of reducing impedance may be obtained, as compared to a multilayer ceramic capacitor according to Comparative Example.

As set forth above, according to exemplary embodiments of the present disclosure, a multilayer ceramic capacitor may include a capacitor part and a resistor part and control respective values thereof.

Therefore, it may be easy to reduce and control impedance in a wider frequency region, as compared to the related art structure. Further, as the number of components is decreased, a mounting space and a cost may be reduced.

In addition, as the capacitor is vertically mounted, downsizing may not be hindered by non-contact terminals. Therefore, such a structure may be advantageous for miniaturizing a product.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor, comprising:
a ceramic body including a plurality of dielectric layers, first and second main surfaces opposing each other, first and second side surfaces opposing each other, and first and second end surfaces opposing each other;
a capacitor part disposed in the ceramic body and including first internal electrodes each having a first lead exposed to the second main surface and second internal electrodes each having a second lead exposed to the first main surface;
a resistor part disposed in the ceramic body and including first internal connection conductors having third and fourth leads exposed to the second main surface and second internal connection conductors having fifth and sixth leads exposed to the first and second main surfaces;
first dummy electrodes disposed in the ceramic body and exposed to the first main surface and the first end surface of the ceramic body and second dummy electrodes disposed in the ceramic body and exposed to the first main surface and the second end surface of the ceramic body;
first to fourth external electrodes disposed on the first and second main surfaces of the ceramic body and electrically connected to the first and second internal electrodes and the first and second internal connection conductors; and
a first connection terminal disposed on the first main surface and the first end surface of the ceramic body and connected to the first dummy electrodes and a second connection terminal disposed on the first main surface and the second end surface of the ceramic body and connected to the second dummy electrodes,
wherein the capacitor part and the resistor part are connected in series to each other.

2. The multilayer ceramic capacitor of claim 1, wherein the first lead of the first internal electrode is connected to the third external electrode, and
the second lead of the second internal electrode is connected to the second external electrode.

3. The multilayer ceramic capacitor of claim 2, wherein the first internal connection conductor is connected to the first internal electrode via the third external electrode and connected to the second internal connection conductor via the fourth external electrode.

4. The multilayer ceramic capacitor of claim 2, wherein one end of the second internal connection conductor is connected to the first internal connection conductor via the fourth external electrode, and the other end thereof is connected to the first external electrode.

5. A multilayer ceramic capacitor, comprising:
a ceramic body including a plurality of dielectric layers and having first and second main surfaces opposing each other, first and second side surfaces opposing each other, and first and second end surfaces opposing each other;
a capacitor part disposed in the ceramic body and including first internal electrodes each having a seventh lead exposed to the second main surface and second internal electrodes each having an eighth lead exposed to the first main surface;
a resistor part disposed in the ceramic body and including first internal connection conductors each having ninth and tenth leads exposed to the second main surface and second internal connection conductors exposed to the first and second main surfaces;
first dummy electrodes disposed in the ceramic body and exposed to the first main surface and the first end surface of the ceramic body and second dummy electrodes disposed in the ceramic body and exposed to the first main surface and the second end surface of the ceramic body;
first to fourth external electrodes disposed on the first and second main surfaces of the ceramic body and electrically connected to the first and second internal electrodes and the first and second internal connection conductors; and
a first connection terminal disposed on the first main surface and the first end surface of the ceramic body and connected to the first dummy electrodes and a second connection terminal disposed on the first main surface and the second end surface of the ceramic body and connected to the second dummy electrodes,
wherein the capacitor part and the resistor part are connected in series to each other.

6. The multilayer ceramic capacitor of claim 5, wherein the seventh lead of the first internal electrode is connected to the fourth external electrode, and the eighth lead of the second internal electrode is connected to the second external electrode.

7. The multilayer ceramic capacitor of claim 6, wherein the first internal connection conductor is connected to the first internal electrode via the fourth external electrode and connected to the second internal connection conductor via the third external electrode.

8. The multilayer ceramic capacitor of claim 6, wherein one end of the second internal connection conductor is connected to the first internal connection conductor via the third external electrode, and the other end thereof is connected to the first external electrode.

9. A multilayer ceramic capacitor, comprising:
a ceramic body including a plurality of dielectric layers and having first and second main surfaces opposing each other, first and second side surfaces opposing each other, and first and second end surfaces opposing each other;
a capacitor part disposed in the ceramic body and including first internal electrodes each having an eleventh lead exposed to the second main surface and second internal electrodes each having a twelfth lead exposed to the first main surface;
a resistor part disposed in the ceramic body and including first internal connection conductors each having thirteenth and fourteenth leads exposed to the second main surface, third internal connection conductors exposed to the first and second main surfaces, second internal connection conductors each having fifteenth and sixteenth leads exposed on the second main surface, and fourth internal connection conductors exposed to the first and second main surfaces, the first and third internal connection conductors being disposed on an dielectric layer and the second and fourth internal connection conductors being disposed on another dielectric layer;
first dummy electrodes disposed in the ceramic body and exposed to the first main surface and the first end surface of the ceramic body and second dummy electrodes disposed in the ceramic body and exposed to the first main surface and the second end surface of the ceramic body;
first to fourth external electrodes disposed on the first and second main surfaces of the ceramic body and electrically connected to the first and second internal electrodes and the first to fourth internal connection conductors; and
a first connection terminal disposed on the first main surface and the first end surface of the ceramic body and connected to the first dummy electrodes and a second connection terminal disposed on the first main surface and the second end surface of the ceramic body and connected to the second dummy electrodes,
wherein the capacitor part and the resistor part are connected in series to each other.

10. The multilayer ceramic capacitor of claim 9, wherein the eleventh lead of the first internal electrode is connected to the fourth external electrode, and the twelfth lead of the second internal electrode is connected to the second external electrode.

11. The multilayer ceramic capacitor of claim 10, wherein the first internal connection conductor is connected to the first internal electrode via the fourth external electrode, connected to the third internal connection conductor via the third external electrode, and connected to the second and fourth internal connection conductors via the fourth external electrode.

12. The multilayer ceramic capacitor of claim 10, wherein the second internal connection conductor is connected to the first internal connection conductor via the third external electrode and connected to the fourth internal connection conductor via the fourth external electrode.

13. The multilayer ceramic capacitor of claim 10, wherein one end of the fourth internal connection conductor is connected to the second internal connection conductor via the fourth external electrode, and the other end thereof is connected to the first external electrode.

14. A multilayer ceramic capacitor, comprising:
a ceramic body including a plurality of dielectric layers and having first and second main surfaces opposing each other, first and second side surfaces opposing each other, and first and second end surfaces opposing each other;
a capacitor part disposed in the ceramic body and including first internal electrodes each having a seventeenth lead exposed to the first main surface and second internal electrodes each having an eighteenth lead exposed to the second main surface;
a first resistor part disposed in the ceramic body and including first internal connection conductors each having nineteenth and twentieth leads exposed to the second main surface and a second resistor part disposed in the ceramic body and including second internal connection conductors each having a twenty-first lead exposed to the first main surface and twenty-second and twenty-third leads exposed to the second main surface;
first dummy electrodes disposed in the ceramic body and exposed to the first main surface and first end surface of the ceramic body and second dummy electrodes disposed in the ceramic body and exposed to the first main surface and the second end surface of the ceramic body;
first to fourth external electrodes disposed on the first and second main surfaces of the ceramic body and electrically connected to the first and second internal electrodes and the first and second internal connection conductors; and
a first connection terminal disposed on the first main surface and the first end surface of the ceramic body and connected to the first dummy electrodes and a second connection terminal disposed on the first main surface and the second end surface of the ceramic body and connected to the second dummy electrodes,
wherein the capacitor part and the first and second resistor parts are connected in series to each other, and
the first and second resistor parts are connected in parallel to each other.

15. The multilayer ceramic capacitor of claim 14, wherein the seventeenth lead of the first internal electrode is connected to the first external electrode, and
the eighteenth lead of the second internal electrode is connected to the third external electrode.

16. The multilayer ceramic capacitor of claim 15, wherein the first internal connection conductor is connected to the second internal electrode via the third external electrode and connected to the second internal connection conductor via the third and fourth external electrodes.

17. The multilayer ceramic capacitor of claim 15, wherein the twenty-second and twenty-third leads of the second internal connection conductor are connected to the first internal connection conductor via the third and fourth external electrodes, and
the twenty-first lead thereof is connected to the second external electrode.

18. A board having a multilayer ceramic capacitor mounted thereon, the board comprising:
a printed circuit board having first to fourth electrode pads disposed thereon; and
the multilayer ceramic capacitor of claim 1 mounted on the printed circuit board.

19. The board of claim 18, wherein the third electrode pad contacts the first connection terminal.

20. The board of claim 18, wherein the fourth electrode pad contacts the second connection terminal.

21. The board of claim 18, wherein the first and third electrode pads contact each other, and
the second and fourth electrode pads contact each other.

22. A board having a multilayer ceramic capacitor mounted thereon, the board comprising:
a printed circuit board having first to fourth electrode pads disposed thereon; and
the multilayer ceramic capacitor of claim 5 mounted on the printed circuit board.

23. A board having a multilayer ceramic capacitor mounted thereon, the board comprising:
a printed circuit board having first to fourth electrode pads disposed thereon; and
the multilayer ceramic capacitor of claim 9 mounted on the printed circuit board.

24. A board having a multilayer ceramic capacitor mounted thereon, the board comprising:
a printed circuit board having first to fourth electrode pads disposed thereon; and
the multilayer ceramic capacitor of claim 14 mounted on the printed circuit board.

* * * * *